United States Patent
Kang et al.

(10) Patent No.: US 10,081,719 B2
(45) Date of Patent: Sep. 25, 2018

(54) THERMOPLASTIC RESIN COMPOSITION FOR AUTOMOBILES AND MOLDED PRODUCT PRODUCED FROM THE SAME

(71) Applicant: Lotte Advanced Materials Co., Ltd., Yeosu-si (KR)

(72) Inventors: Hyoungtaek Kang, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/723,745

(22) Filed: May 28, 2015

(65) Prior Publication Data

US 2015/0344673 A1 Dec. 3, 2015

(30) Foreign Application Priority Data

May 29, 2014 (KR) .................. 10-2014-0065341

(51) Int. Cl.
| | |
|---|---|
| C08G 69/26 | (2006.01) |
| C08L 77/00 | (2006.01) |
| C08L 79/00 | (2006.01) |
| C08K 5/17 | (2006.01) |
| C08K 5/092 | (2006.01) |
| C08K 7/14 | (2006.01) |
| C08L 77/06 | (2006.01) |

(52) U.S. Cl.
CPC ............ *C08K 5/175* (2013.01); *C08G 69/265* (2013.01); *C08K 5/092* (2013.01); *C08K 7/14* (2013.01); *C08L 77/06* (2013.01)

(58) Field of Classification Search
None
See application file for complete search history.

(56) References Cited

U.S. PATENT DOCUMENTS

| 4,602,058 A * | 7/1986 | Graham ................... C08K 5/09 428/435 |
| 8,618,209 B2 | 12/2013 | Lee et al. |
| 2012/0196962 A1 | 8/2012 | Kobayashi et al. |
| 2013/0197145 A1 | 8/2013 | Thompson et al. |

FOREIGN PATENT DOCUMENTS

| EP | 0392602 A1 | 10/1990 |
| JP | 05-043798 A | 2/1993 |
| JP | 2646743 B2 | 8/1997 |
| KR | 10-2009-0038510 A | 4/2009 |
| KR | 10-2012-0089912 A | 8/2012 |
| WO | 2014/073219 A1 | 5/2014 |
| WO | 2016/093465 A1 | 6/2016 |

OTHER PUBLICATIONS

Extended European Search Report in counterpart European Application No. 15169615.0 dated Aug. 12, 2015, pp. 1-5.
International Search Report in commonly owned International Application No. PCT/KR2015/008831 dated Oct. 29, 2015, pp. 1-4.
Office Action in commonly owned U.S. Appl. No. 14/792,300 dated Sep. 29, 2017, pp. 1-12.
Office Action in commonly owned U.S. Appl. No. 15/533,047 dated Oct. 3, 2017, pp. 1-11.
Office Action in commonly owned Korean Application No. 10-2014-0175895 dated Apr. 27, 2017, pp. 1-6.
Office Action in counterpart Korean Application No. 10-2015-0075923 dated Apr. 19, 2017, pp. 1-6.

* cited by examiner

*Primary Examiner* — Robert T Butcher
(74) *Attorney, Agent, or Firm* — Additon, Higgins & Pendleton, P.A.

(57) ABSTRACT

A thermoplastic resin composition for automobiles, and a molded product produced from the composition, includes a semi-aromatic polyamide resin; a first chelate agent that includes an amino radical and at least one of a carboxylic acid and salt thereof; a second chelate agent that includes an aliphatic multivalent C1 to C10 carboxylic acid (not including a carbon atom of a carboxylic radical) having 2 to 4 carboxylic radicals; and a filler.

10 Claims, No Drawings

THERMOPLASTIC RESIN COMPOSITION FOR AUTOMOBILES AND MOLDED PRODUCT PRODUCED FROM THE SAME

CROSS-REFERENCE TO RELATED APPLICATION

This application claims the benefit of priority under 35 U.S.C. § 119(a) of Korean Patent Application No. 10-2014-0065341, filed on May 29, 2014, in the Korean Intellectual Property Office, the entire disclosure of which is incorporated herein by reference for all purposes.

FIELD

Various embodiments of the present invention relate to a thermoplastic resin composition for automobiles.

BACKGROUND

Polyamide resin is widely used in various fields including electrical components, electronics components, and automobile components due to its excellent heat resistance, wear resistance, chemical resistance, and flame retardancy.

Due to the recent trend towards weight reduction in the automobile field, metal components are being replaced by plastic components. Polyamide resin compositions having excellent heat resistance have been used for engine rooms in automobiles which are under the hood areas that are exposed to high temperature environments for long periods of time.

In the automobile field, engines are being down-sized to increase fuel efficiency, leading to an increase of vehicles having turbo chargers. In the case of an automobile using a turbo charger, the temperature inside the under hood increases more rapidly than conventional automobiles when high-powered. Thus, there is a growing need for materials having higher heat resistance for use in components that will be installed inside the under hood so that they can withstand the high temperature environment for long periods of time.

In order to secure long-term heat resistance in a polyamide resin composition, organic antioxidants such as phenol or phosphite compounds are widely used. These organic antioxidants, however, can have limitations in maintaining excellent properties for long periods of time at high temperatures to a satisfying level.

Copper halide thermal stabilizers such as CuI/Ki compounds are also used which are known to have even higher long term thermal stability at high temperatures than organic antioxidants. However, copper may discolor or precipitate as time passes, causing problems when used in electrical, electronic and automobile components.

Therefore, there is a need for a polyamide resin composition that can maintain its high thermal stability even when exposed to high temperatures for long periods of time so that it can be used in components for use in an engine room inside an under hood of an automobile.

SUMMARY

Therefore, a purpose of various embodiments of the present disclosure is to resolve the aforementioned problems of conventional technology, that is, to provide a thermoplastic resin composition for automobiles that can have excellent long-term thermal stability, discoloration resistance and processability in order to maintain the mechanical strength for long periods of time.

An embodiment of the present disclosure provides a thermoplastic resin composition for automobiles, the composition including a semi-aromatic polyamide resin; a first chelate agent that includes an amino radical and at least one of a carboxylic acid and salt thereof; a second chelate agent that includes an aliphatic multivalent C1 to C10 carboxylic acid (not including a carbon atom of a carboxylic radical) having 2 to 4 carboxylic radicals; and a filler.

The thermoplastic resin composition for automobiles may include about 30 to about 85 weight % semi-aromatic polyamide resin, about 0.1 to about 0.9 weight % first chelate agent, about 0.1 to about 5 weight % second chelate agent, and about 10 to about 65 weight % filler, each based on the total weight (100 weight %) of the semi-aromatic polyamide resin, first chelate agent, second chelate agent, and filler.

The filler may be glass fiber.

The semi-aromatic polyamide resin may include a repeat unit including a dicarboxylic acid unit including about 10 to about 100 mol % aromatic dicarboxylic acid and an aliphatic and/or alicyclic diamine unit.

The semi-aromatic polyamide resin may include at least one of a polyamide (PA6T/66) including hexamethylene terephthalamide and hexamethylene adipamide and/or a polyamide (PA6T/DT) including hexamethylene terephthalamide and 2-methylpentamethylene terephthalamide.

The semi-aromatic polyamide resin may have a glass transition temperature (Tg) of about 80 to about 150° C.

The first chelate agent may be one or more selected from the group consisting of EDTA (ethylene diamine-N,N,N',N'-tetraacetic acid), EGTA (ethylene glycol bis(2-aminoethylether)-N,N,N',N'-tetraacetic acid), CyDTA (trans-1,2-diaminocyclohexane-N,N,N',N'-tetraacetic acid), DTPA (diethylenetriamine pentaacetic acid), TETHA (triethylenetetraamine-N,N,N',N'',N''',N'''-hexaacetic acid), HEDTA (N-(2-hydroxyethyl)ethylenediaminetriacetic acid), and a metal salt thereof.

The first chelate agent may include at least one metal ion selected from sodium (Na), aluminum (Al), iron (Fe), copper (Cu), zinc (Zn), tin (Sn), titanium (Ti), nickel (Ni), antimony (Sb), magnesium (Mg), vanadium (V), chrome (Cr), and zirconium (Zr) ion.

The thermoplastic resin composition may have a tensile strength "a", with respect to an initial tensile strength $a_0$, measured according to ASTM D638 after 500 hours at 220° C., expressed by formula 1:

$$70 \leq \frac{a}{a_0} \times 100 \leq 95 \qquad \text{[Formula 1]}$$

Another embodiment of the present disclosure provides a molded product produced from the aforementioned thermoplastic resin composition.

The molded product may be at least a component inside an under hood.

The molded product may be a battery fuse, turbo resonator, and/or intercooler tank.

The aforementioned thermoplastic resin composition for automobiles according to the embodiments of the present disclosure can provide an advantage of maintaining the initial properties at high temperatures for long periods of time.

Furthermore, the aforementioned thermoplastic resin composition for automobiles can generate only a small amount of gas when being processed and thus may be easily processed, and can have an excellent discoloration resistance.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinbelow, explanation will be made on a thermoplastic resin composition for automobiles according to the present disclosure.

The thermoplastic resin composition for automobiles according to an embodiment of the present disclosure includes a semi-aromatic polyamide resin, chelate agent, and filler, the chelate agent including a first chelate agent and a second chelate agent.

Herein, 'first' and 'second' are used only to distinguish different types of chelate agents, and they have no affect on interpreting the scope of the right.

Hereinbelow, explanation will be made in detail on each of the components that forms the thermoplastic resin composition according to embodiments of the present disclosure.

Semi-Aromatic Polyamide Resin

The semi-aromatic polyamide resin may be a semi-aromatic polyamide resin having high heat resistance.

The semi-aromatic polyamide resin may be a polymer, a copolymer, or a blend of two or more (co)polymers formed from a monomer containing an aromatic radical. Herein, the term copolymer means a polyamide having two or more different repeat units of amide and/or diamide molecules.

The semi-aromatic polyamide resin has a structure wherein its main chain includes an aromatic compound. This semi-aromatic polyamide resin may be produced by a condensation polymerization of a dicarboxylic acid monomer that includes about 10 to about 100 mol % aromatic dicarboxylic acid and a diamine monomer that includes a C4 to C20 aliphatic diamine and/or C4 to C20 alicyclic diamine.

In some embodiments, the dicarboxylic acid monomer may include aromatic dicarboxylic acid in an amount about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of aromatic carboxylic acid can be in a range from about any of the foregoing amounts to about any other of the foregoing amounts.

Examples of the dicarboxylic acid monomer may include without limitation terephthalic acid and/or isophthalic acid including an aromatic benzene ring in its molecules.

In order words, a repeat unit of the semi-aromatic polyamide resin may include a dicarboxylic acid unit and an aliphatic and/or alicyclic diamine unit, the dicarboxylic acid unit including about 10 to about 100 mol % aromatic dicarboxylic acid.

The dicarboxylic acid unit may be derived from, for example, terephthalic acid, isophthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like, and mixtures thereof.

The dicarboxylic acid unit may further include a unit derived from a nonaromatic dicarboxylic acid in addition to the aromatic dicarboxylic acid. The nonaromatic dicarboxylic acid may be an aliphatic and/or alicyclic dicarboxylic acid. For example, the nonaromatic dicarboxylic acid may be derived from an aliphatic dicarboxylic acid such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, suberic acid, and the like, and mixtures thereof; and/or an alicyclic dicarboxylic acid such as 1,3-cyclophentanedicarboxylic acid, 1,4-cyclohexanedicarboxylic acid, and the like, and mixtures thereof.

The nonaromatic dicarboxylic acid may be used singly or in a mixture of two or more thereof.

The dicarboxylic acid unit may include the nonaromatic dicarboxylic acid in an amount of about 90 mol % or less, for example about 80 mol % or less, about 70 mol % or less, or about 60 mol % or less. In some embodiments, the dicarboxylic acid unit may include nonaromatic dicarboxylic acid in an amount of 0 (the nonaromatic dicarboxylic acid is not present), about 0 (the nonaromatic dicarboxylic acid is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 weight %. Further, according to some embodiments of the present invention, the amount of the nonaromatic dicarboxylic acid can be in a range from about any of the foregoing amounts to about any other of the foregoing amounts.

The aliphatic diamine unit may be derived from an aliphatic alkylene diamine including 4 to 18 carbon atoms. Examples of the C4 to C18 aliphatic alkylene diamine may include without limitation linear aliphatic alkylene diamines such as 1,6-hexanediamine, 1,7-heptanediamine, 1,8-octanediamine, 1,9-nonanediamine, 1,10-decanediamine, 1,11-undecanediamine, and/or 1,12-dodecanediamine; and/or branched aliphatic alkylene diamines such as 1-butyl-1,2-ethanediamine, 1,1-dimethyl-1,4-butanediamine, 1-ethyl- 1,4-butanediamine, 1,2-dimethyl-1,4-butanediamine, 1,3-dimethyl-1,4-butanediamne, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and/or 5-methyl-1,9-nonanediamine.

The aliphatic diamine unit may be derived from one or more diamines such as but not limited to 1,6-hexanediamine, 1,7-heptanediamine, 1,10-decanediamine, 1,11-undecanediamine, 1,12-dodecanediamine, 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-dimethyl-1,6-hexanediamine, 2,2-diethyl-1,7-heptanediamine, 2,3-dimethyl-1,7-heptanediamine, 2,4-dimethyl-1,7-heptanediamine, and/or 2,5-dimethyl-1,7-heptanediamine.

The semi-aromatic polyamide resin may include a polyamide (PA6T/66) including hexamethylene terephthalamide and hexamethylene adipamide; a polyamide (PA6T/DT) including hexamethylene terephthalamide and 2-methylpentamethylene terephthalamide; and the like and combinations thereof. In exemplary embodiments, PA6T/66 may be used.

The semi-aromatic polyamide resin is a resin that may exhibit high heat resistance characteristics, and the glass transition temperature (Tg) of the semi-aromatic polyamide resin may be about 80 to about 150° C., for example about 85 to about 120° C.

There is no particular limitation to the molecular weight of the semi-aromatic polyamide resin as long as it has an intrinsic viscosity (IV) of about 0.75 or more, for example about 0.75 to about 1.15.

In some embodiments, the thermoplastic resin composition may include the semi-aromatic polyamide resin in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 weight %. Further, according to some embodiments of the present invention, the amount of the semi-aromatic polyamide resin can be in a range from about any of the foregoing amounts to about any other of the foregoing amounts.

Chelate Agent

The aforementioned thermoplastic resin composition for automobiles may use two types of chelate agents including a first chelate agent and a second chelate agent.

First Chelate Agent

The first chelate agent may include an amino radical and at least one of a carboxylic acid and salt thereof.

The first chelate agent is a compound having a functional radical that may form a bond with a metal ion in its molecular structure. The first chelate agent may bond with a positive ion of a metal salt ionized into positive ions and negative ions to form a stabilized chelate complex compound.

The first chelate agent used may be a compound having a multivalent carboxylic radical or a mixture of two or more thereof. For example, it may be a compound having a polycarboxylic acid or carboxylate radical, and can include a functional radical expressed by chemical formula 1a, 1b and/or 1c shown below.

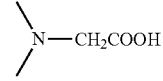

[Chemical formula 1a]

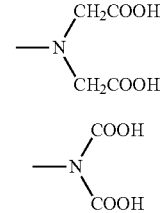

[Chemical formula 1b]

[Chemical formula 1c]

Examples of a compound that includes a functional radical that may be expressed by the aforementioned chemical formula 1a to 1c may include without limitation EDTA (ethylene diamine-N,N,N',N'-tetraacetic acid), EGTA (ethylene glycol bis(2-aminoethylether)-N,N,N',N'-tetraacetic acid), CyDTA (trans-1,2-diaminocyclohexane-N,N,N',N'-tetraacetic acid), DTPA (diethylene triamine pentaacetic acid), TETHA (triethylenetetraamine-N,N,N',N'',N''',N'''-hexaacetic acid), HEDTA (N-(2-hydroxyethyl)ethylenediamine triacetic acid), metal salts thereof, and the like, and combinations thereof.

Examples of the metal ion that can form a bond with the first chelate agent may include without limitation sodium (Na), aluminum (Al), iron (Fe), copper (Cu), zinc (Zn), tin (Sn), titanium (Ti), nickel (Ni), antimony (Sb), magnesium (Mg), vanadium (V), chrome (Cr), and/or zirconium (Zr) ion. However, there are no limitations to the ions above, and thus any metal ion may be used as long as it exhibits the same functional effects. In exemplary embodiments, the metal ion may be sodium, and the first chelate agent with a metal ion may be EDTA-2Na (ethylene diamine tetraacetic acid-disodium salt).

The thermoplastic resin composition may include the first chelate agent in an amount of about 0.1 to about 0.9 weight %, for example about 0.5 to about 0.9 weight %, based on the total weight (100 weight %) of the semi-aromatic polyamide resin, first chelate agent, second chelate agent, and filler. In some embodiments, the thermoplastic resin composition may include the first chelate agent in an amount of about 0.1, 0.2, 0.3, 0.4, 0.5, 0.6, 0.7, 0.8, or 0.9 weight %. Further, according to some embodiments of the present invention, the amount of the first chelate agent can be in a range from about any of the foregoing amounts to about any other of the foregoing amounts.

When the first chelate agent is present in an amount of less than about 0.1 weight %, there may be insignificant improvement of the long term thermal stability, and when the first chelate agent is present in an amount exceeding about 0.9 weight %, the composition can generate an increased amount of gas during the process of producing the thermoplastic resin composition, which can deteriorate processability, reduce the mechanical strength of the thermoplastic resin composition, and cause discoloration.

Second Chelate Agent

The second chelate agent may include an aliphatic multivalent C1 to C10 carboxylic acid (not including carbons of a carboxylic radical) having 2 to 4 carboxylic radicals. The second chelate agent may include a mixture of two or more different types of such aliphatic multivalent carboxylic acids, and/or a derivative of the aliphatic multivalent carboxylic acid such as acid anhydride, acid chloride, and ester.

Examples of the aliphatic multivalent carboxylic acid may include without limitation fumaric acid, succinic acid, 3,3-diethylsuccinic acid, malonic acid, dimethylmalonic acid, tartaric acid, maleic acid, citric acid, malic acid, adipic acid, 2-methyladipic acid, tri-methyladipic acid, itaconic acid, glutaric acid, 2,2-dimethylglutaric acid, pimelic acid, azelaic acid, dimer acid, sebacic acid, suberic acid, decanedicarboxylic acid, dodecanedicarboxylic acid, citraconic acid, tetrahydrophthalic acid, 1,2,3,4-butanetetracarboxylic acid, oxalic acid, and the like, and combinations thereof.

However, there are no limitations to the aliphatic multivalent carboxylic acid used in the second chelate agent of the present disclosure as long as it exhibits the same functional effects. In exemplary embodiments, citric acid may be used.

The thermoplastic resin composition may include the second chelate agent in an amount of about 0.1 to about 5 weight %, based on the total weight (100 weight %) of the semi-aromatic polyamide resin, first chelate agent, second chelate agent and filler. In some embodiments, the thermoplastic resin composition may include the second chelate agent in an amount of about 0.1, 0.2, 0.3, 0.4, 0.5, 0.6, 0.7, 0.8, 0.9, 1, 2, 3, 4, or 5 weight %. Further, according to some embodiments of the present invention, the amount of second chelate agent can be in a range from about any of the foregoing amounts to about any other of the foregoing amounts.

When the second chelate agent is present in an amount within this range, it may contribute to the long term thermal stability effects stably together with the first chelate agent.

When aging at a high temperature, the first chelate agent and the second chelate agent may oxidize the surface to promote generation of char, thereby preventing an oxidized layer from penetrating inside the thermoplastic resin and thus prevent decomposition of the thermoplastic resin. This may provide a long term thermal stability effect.

Filler

The thermoplastic resin composition for automobiles according to the present disclosure includes a filler. It can be possible to secure a desired degree of mechanical strength by adjusting the amount of filler to be included.

The filler used in the present disclosure may be glass fiber.

The diameter of the glass fiber may be about 8 to about 20 µm, and the length of the glass fiber may be about 1.5 to about 8 mm. When the diameter is within the aforementioned range, it is possible to obtain excellent strength reinforcement effects, and when the length is within the aforementioned range, the glass fiber may be easily put into a processing device such as an extruder, and the strength reinforcement effects may be significantly improved.

The glass fiber may be mixed with another fiber that is not the same as the glass fiber. Examples of the other fiber can include without limitation carbon fiber, basalt fiber, fiber produced from biomass, and the like, and combinations thereof, and then used in the present disclosure. Biomass means plants and/or organisms that use microorganisms as energy source.

The cross-section of the glass fiber used in the present disclosure may be circular, rectangular, and/or a dumbbell shape including two connected circles.

The aspect ratio of the cross-section of the glass fiber used in the present disclosure may be less than about 1.5. For example, the glass fiber may have a circular cross-section with an aspect ratio of about 1. Herein, the aspect ratio is defined as the ratio of the longest diameter to the shortest diameter. When using glass fiber of the aforementioned aspect ratio range, it is possible to reduce the unit cost of the product, and by using glass fiber having a circular cross-section, it is possible to improve dimensional stability and appearance.

The glass fiber may be surface treated to include a predetermined chemical compound called sizing in order to prevent the glass fiber from reacting with the resin and to improve the degree of impregnation. Such surface treatment of the glass fiber may be performed when producing the glass fiber or in a subsequent process.

The filler may be used together with the second chelate agent, further increasing the effect of improved long term thermal stability.

For example, when using the glass fiber as filler, filaments that look like hair may be subjected to the surface-processing wherein their surfaces are coated by the sizing. In general, sizing is used to protect the filaments from friction that may occur on the contact surfaces during the entire processes of the glass fiber or to enable easy bonding between the glass fiber and the resin.

As the first chelate agent and the second chelate agent react with the sizing material of the glass fiber, the long term stability may be improved.

The strength of the glass fiber may be determined by the silicate network. Alkali oxide of the glass fiber may not be easily integrated with the silicate network structure, causing the strength to deteriorate. However, when using the first chelate agent and the second chelate agent at the same time as in the present disclosure, the first chelate agent and the second chelate agent can bond with the sizing material of the glass fiber and can prevent the action of the alkali oxide, and thus it is possible to maintain strength even when exposed to a high temperature for a long period of time.

The thermoplastic resin composition may include the filler in an amount of about 10 to about 65 weight % based on the total weight (100 weight %) of the semi-aromatic polyamide resin, first chelate agent, second chelate agent, and filler. In some embodiments, the thermoplastic resin composition may include the filler in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 weight %. Further, according to some embodiments of the present invention, the amount of the filler can be in a range from about any of the foregoing amounts to about any other of the foregoing amounts.

The thermoplastic resin composition for automobiles may include about 30 to about 85 weight % semi-aromatic polyamide resin, about 0.1 to about 0.9 weight % first chelate agent, about 0.1 to about 5 weight % second chelate agent, and about 10 to about 65 weight % filler.

According to an embodiment of the present disclosure, the thermoplastic resin composition for automobiles may further include an additive depending on usage. Examples of the additive may include, without limitation, a dye, pigment, thermal stabilizer, UV stabilizer, lubricant, antimicrobial, releasing agent, nucleating agent, antistatic agent, antioxidant and/or inorganic additive. These may be used singly or in a mixture of two or more thereof.

Due to the use of the first chelate agent and the second chelate agent, the aforementioned thermoplastic resin composition for automobiles can have excellent long term thermal stability and may exhibit minimal or no deterioration of other properties of the semi-aromatic polyamide resin such as wear resistance, chemical resistance, flame retardant, and/or mechanical strength.

The thermoplastic resin composition for automobiles according to an embodiment of the present disclosure may have a tensile strength "a" measured according to ASTM D638, with respect to (as a percentage of) an initial tensile strength "$a_0$", after being left at 220° C. for 500 hours, expressed by formula 1 below.

$$70 \leq \frac{a}{a_0} \times 100 \leq 95 \quad \text{[Formula 1]}$$

The thermoplastic resin composition according to the present disclosure may be produced by a well known method. For example, it may be produced in a pellet form by mixing the components of the present disclosure and optional additives at the same time, and then melting and extruding them in an extruder.

The thermoplastic resin composition for automobiles may be applied to any types of molded products that require heat resistance.

For example, the thermoplastic resin composition may be applied to a component inside an under hood of an automobile. For example, it may be applied to, without limitation, a battery fuse, turbo resonator, and/or intercooler tank that are peripheral components of an engine room.

EXAMPLES

Hereinbelow are examples that include test results to prove the excellent effects of the thermoplastic resin composition of the present disclosure.

Components used for the thermoplastic resin composition of the embodiments and comparative examples are as follows.

(a) Semi-Aromatic Polyamide Resin
A6000, a PA6T/66 product of Solvay Company is used.
(b) First Chelate Agent
EDTA-2Na of Dow Chemical Company is used.
(c) Second Chelate Agent
Citric acid anhydride of Samchun Chemical is used.
(d) Filler
983, a glass fiber product having a diameter of 10 μm and a chip length of 4 mm of Owens Corning Company, is used.
(e) Heat Stabilizer
TP-H9008, a mixed product of CuI/KI of Brueggemann Company, is used.

The thermoplastic resin compositions according to the embodiments and comparative examples are produced in accordance with the component content (amount) ratios shown in table 1 below.

The components shown in table 1 are put into a mixer, and then dry-blended. Then, they are put into a twin-screw extruder having an L/D of 45 and φ of 45 mm, and through this extruder, a thermoplastic resin composition is produced in the form of pellets. From the produced pellets, a specimen is produced using an injection molder set up to 330° C. to evaluate properties.

The unit of the content (amount) ratios of each component shown in table 1 is weight %.

TABLE 1

|  | Embodiments | | | Comparative examples | | | | | |
| --- | --- | --- | --- | --- | --- | --- | --- | --- | --- |
|  | 1 | 2 | 3 | 1 | 2 | 3 | 4 | 5 | 6 |
| (a) | 63.5 | 63.2 | 61.5 | 64.8 | 63.8 | 63.8 | 64 | 62 | 57.5 |
| (b) | 0.5 | 0.8 | 0.5 | — | 1 | — | — | 2 | 0.5 |
| (c) | 1 | 1 | 3 | — | — | 1 | 1 | 1 | 7 |
| (d) | 35 | 35 | 35 | 35 | 35 | 35 | 35 | 35 | 35 |
| (e) | — | — | — | 0.2 | 0.2 | 0.2 | — | — | — |

The thermoplastic resin compositions according to embodiments 1 to 3 and comparative examples 1 to 6 are evaluated for the long term thermal stability, amount of gas generation and discoloration resistance. The methods used for each item of evaluation are as follows. The evaluation results of each item are shown in table 2.

<Long Term Heat Resistance Evaluation>

A portion of each specimen produced using the thermoplastic resin composition according to embodiments 1 to 3 and comparative examples 1 to 6 is left for 48 hours under a temperature of 23° C., and relative humidity of 50%, and then its initial tensile strength ($a_0$) is measured according to ASTM D638. Herein, the measurement speed of the tensile strength is 5 mm/min. Then, the remaining portion of each specimen is left for 500 hours under 200° C., and then its tensile strength (a) is measured. The long term thermal stability is evaluated based on the tensile strength maintenance rate calculated using formula 2 shown below.

$$\frac{a}{a_0} \times 100 (\%) \quad \text{[Formula 2]}$$

<Amount of Gas Generation Evaluation>

About 5 g of pellets produced using the thermoplastic resin compositions according to embodiments 1 to 3 and comparative examples 1 to 6 is weighed in a Petri dish, and then closed by a dish cap, and then placed on a hot plate for 2 hours under a temperature of 330° C. Then, the amount of volatile material adsorbed onto the dish cap is measured. The amount of gas generation is calculated using formula 3 shown below.

$$\frac{C - C_0}{S} \times 10^6 (\text{ppm}) \quad \text{[Formula 3]}$$

(In formula 3, C is the weight of the dish cap after the evaluation, $C_0$ is the weight of the dish cap before the evaluation, and S is the weight of the pellet specimen used in the evaluation.)

<Discoloration Resistance Evaluation>

The YI (Yellow Index) of the surface each specimen produced using the thermoplastic resin composition according to embodiments 1 to 3 and comparative examples 1 to 6 is measured using the color-difference meter of 3600D CIE Lab. of Konica Minolta Company.

TABLE 2

| | Embodiments | | | Comparative examples | | | | | |
|---|---|---|---|---|---|---|---|---|---|
| | 1 | 2 | 3 | 1 | 2 | 3 | 4 | 5 | 6 |
| Initial tensile strength (kgf/cm$^2$) | 2056 | 2068 | 2081 | 1917 | 2092 | 2118 | 2133 | 1924 | 1955 |
| Tensile strength (kgf/cm$^2$) after 500 hrs under 220° C. | 1790 | 1810 | 1969 | 1258 | 1159 | 1152 | 1333 | 1710 | 1780 |
| Maintenance rate of tensile strength (%) | 87 | 88 | 95 | 66 | 55 | 54 | 62 | 89 | 91 |
| Amount of gas generation (ppm) | 550 | 750 | 850 | 630 | 890 | 720 | 660 | 3200 | 2200 |
| Yellow Index | 15 | 19 | 22 | 8 | 12 | 17 | 15 | 32 | 38 |

Tables 1 and 2 show that the specimens produced from the thermoplastic resin compositions according to embodiments 1 to 3 of the present disclosure exhibit excellent mechanical properties including long term thermal stability and also excellent discoloration resistance. Furthermore, there are only small amounts of gas generation, showing excellent processability as well.

It can be seen that the thermoplastic resin compositions according to embodiments 1 to 3 of the present disclosure have initial tensile strengths all exceeding 2,000 kgf/cm$^2$ when the glass fiber content is 35%, which proves excellent mechanical properties, whereas the thermoplastic resin compositions according to comparative examples 1, 5, and 6 have tensile strengths that fall short of 2,000 kgf/cm$^2$ with the same amount of glass fiber.

Even when using copper halide group compounds, which are conventional thermal stabilizers (comparative examples 1, 2, and 3), the maintenance rates of tensile strength remains between 54 and 66%, which shows that their long term thermal stabilities are far lower than the thermoplastic resin compositions according to the embodiments of the present disclosure.

Furthermore, when using only one of EDTA-2Na (comparative example 2) and citric anhydride (comparative examples 3 and 4) as the chelate agent, the maintenance rate of tensile strength decreases by between about 25% and about 33% compared to embodiment 1, which shows that when two chelate agents of certain amounts are used, the maintenance rate of tensile strength may be maintained at a high level even when exposed to high temperatures for a long time.

Furthermore, even when both the first and second chelate agents are used, if the amounts of chelate agents are not within the ranges of the present disclosure (comparative examples 5 and 6), there is too much gas generation, reducing the processability, and the Yellow Index increases, showing that the discoloration resistance deteriorates to such an extent that the yellowness of the resin composition can be observed.

On the other hand, the thermoplastic resin compositions according to the embodiments of the present disclosure exhibit small amounts of gas generation due to slow progress of thermal decomposition (embodiments 1 to 3), and Yellow Indexes are also less than 25, showing that they have excellent discoloration resistance (embodiments 1 to 3).

Therefore, the aforementioned proves that the thermoplastic resin compositions according to the embodiments of the present disclosure are excellent in terms of tensile strength, long term thermal stability, processability and discoloration resistance.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A thermoplastic resin composition for automobiles, the composition comprising:
   about 30 to about 85 weight % of a semi-aromatic polyamide resin comprising PA6T/66, PA6T/DT, and/or PA6T/6I;
   about 0.1 to about 0.9 weight % of a first chelate agent comprising ethylene diamine-N,N,N', N'-tetraacetic acid (EDTA), ethylene glycol bis(2-aminoethylether)-N,N,N',N'-tetraacetic acid (EGTA), triethylenetetraamine-N,N,N',N'',N''',N'''-hexaacetic acid (TETHA), and/or a metal salt thereof;
   about 0.1 to about 5 weight % of a second chelate agent comprising citric acid, succinic acid, oxalic acid, and/or an anhydride thereof; and
   about 10 to about 65 weight % of a filler comprising glass fiber,
   wherein the weight % are based on the total weight of the semi-aromatic polyamide resin, first chelate agent, second chelate agent, and filler, and
   wherein the composition has a tensile strength a, measured with respect to an initial tensile strength $a_o$ according to ASTM D638 after 500 hours at 220° C., expressed by formula 1:

$$70 \leq \frac{a}{a_0} \times 100 \leq 95.$$

2. The composition according to claim 1, wherein the semi-aromatic polyamide resin has a glass transition temperature of about 80 to about 150° C.

3. A molded product produced from the thermoplastic resin composition of claim 1.

4. The molded product according to claim 3, comprising a component inside an under hood.

5. The molded product according to claim 3, comprising a battery fuse.

6. The composition according to claim 1, wherein:
   the semi-aromatic polyamide resin comprises polyamide PA6T/66;

the first chelate agent comprises EDTA and/or a metal salt thereof in an amount of about 0.1 to 0.8 weight %; and the second chelate agent comprises citric acid and/or an anhydride thereof.

7. The molded product according to claim 3, comprising a turbo resonator.

8. The molded product according to claim 3, comprising an intercooler tank.

9. The composition according to claim 1, wherein the composition comprises about 0.1 to 0.8 weight % of the first chelate agent.

10. The composition according to claim 1, wherein:

the semi-aromatic polyamide resin comprises polyamide PA6T/66 and/or PA6T/DT;

the first chelate agent comprises EDTA, EGTA, TETHA, and/or a metal salt thereof; and the second chelate agent comprises citric acid, succinic acid, oxalic acid, and/or an anhydride thereof.

\* \* \* \* \*